US008797187B2

(12) United States Patent
Harber et al.

(10) Patent No.: US 8,797,187 B2
(45) Date of Patent: Aug. 5, 2014

(54) STREET PARKING AVAILABILITY ESTIMATION

(75) Inventors: Dustin Harber, San Ramon, CA (US); Matthew Kresse, Mountain View, CA (US); Vinuth Rai, Mountain View, CA (US)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 109 days.

(21) Appl. No.: 13/436,580

(22) Filed: Mar. 30, 2012

(65) Prior Publication Data

US 2013/0257632 A1 Oct. 3, 2013

(51) Int. Cl.
*B60Q 1/48* (2006.01)
*G05D 1/00* (2006.01)

(52) U.S. Cl.
USPC ..... 340/932.2; 340/934; 340/990; 340/995.1; 340/995.13; 340/995.14; 340/988; 701/1; 701/118; 701/400; 701/408; 701/409; 701/414; 701/425

(58) Field of Classification Search
CPC .... G01C 21/3685; G01C 21/00; G01C 21/26; G01C 21/28; G01C 21/32; G01C 21/34; G01C 21/3407; G01C 21/3605; G08G 1/00; G08G 1/01; G08G 1/0104; G08G 1/0108; G08G 1/0112; G08G 1/012; G08G 1/0125; G08G 1/0129; G08G 1/0133; G08G 1/065; G08G 1/14; G08G 1/141; G08G 1/143; G08G 1/144; G08G 1/145; G08G 1/147; B60W 2250/402; B60W 2250/406
USPC ........................................................ 340/932.2
See application file for complete search history.

(56) References Cited

U.S. PATENT DOCUMENTS 5,910,782 A 6/1999 Schmitt et al.
6,147,624 A * 11/2000 Clapper ..................... 340/932.2
6,285,297 B1 9/2001 Ball et al.
6,426,708 B1 * 7/2002 Trajkovic et al. .......... 340/932.2
6,694,259 B2 2/2004 Curbow et al.

(Continued)

FOREIGN PATENT DOCUMENTS

JP 2009162529 A 7/2009
JP 2009162567 A 7/2009
JP 2009162568 A 7/2009
JP 2009162569 A 7/2009

OTHER PUBLICATIONS

Roadify.com. Retrieved Mar. 3, 2014 from http://www.roadify.com, 1 page.

(Continued)

*Primary Examiner* — Steven Lim
*Assistant Examiner* — Ryan Sherwin
(74) *Attorney, Agent, or Firm* — Patent Law Works LLP

(57) ABSTRACT

A system and method for estimating street parking availability for a user is disclosed. The system comprises a communication module and a parking probability generator. The communication module receives data describing a set of traces for a group of vehicles associated with a group of users. The parking probability generator assigns the set of traces to one or more street segments based at least in part on street segment data describing the one or more street segments. The parking probability generator generates one or more parking probabilities for the one or more street segments based at least in part on one or more user densities in the one or more street segments.

19 Claims, 7 Drawing Sheets

(56) References Cited

U.S. PATENT DOCUMENTS

| | | | | |
|---|---|---|---|---|
| 6,885,311 | B2 * | 4/2005 | Howard et al. | 340/932.2 |
| 6,885,312 | B1 * | 4/2005 | Kirkpatrick | 340/932.2 |
| 7,312,722 | B2 | 12/2007 | Tillotson et al. | |
| 7,893,847 | B2 | 2/2011 | Shanbhag et al. | |
| 7,899,583 | B2 | 3/2011 | Mendelson | |
| 7,957,900 | B2 * | 6/2011 | Chowdhary et al. | 701/300 |
| 8,111,172 | B2 * | 2/2012 | Morimoto et al. | 340/932.2 |
| 8,217,806 | B2 * | 7/2012 | Kim | 340/932.2 |
| 8,306,734 | B2 | 11/2012 | Mathews et al. | |
| 8,423,275 | B1 * | 4/2013 | Kandal | 340/932.2 |
| 8,576,092 | B2 | 11/2013 | Levy et al. | |
| 2010/0060485 | A1 * | 3/2010 | Kim | 340/932.2 |
| 2010/0302067 | A1 * | 12/2010 | Goldman et al. | 340/932.2 |
| 2010/0302068 | A1 * | 12/2010 | Bandukwala | 340/932.2 |
| 2011/0063132 | A1 * | 3/2011 | Trum | 340/932.2 |
| 2012/0161986 | A1 * | 6/2012 | Amir | 340/932.2 |

OTHER PUBLICATIONS

Goodwin, Antuan, “Open Spot App helps Android users find parking,” CNET Jul. 12, 2010, 2 pages.

* cited by examiner

STREET PARKING AVAILABILITY ESTIMATION

BACKGROUND

The specification relates to data processing systems. In particular, the specification relates to a system and method for estimating street parking availability for a user.

Finding parking in many urban areas around the world is a difficult task. According to one estimate, 30% of traffic in New York City is caused by drivers simply looking for available parking on the streets. If drivers knew where there was available parking, this traffic would disappear and drivers would spend less time and fuel looking for parking.

There are several applications and technologies that attempt to solve this problem. Many companies measure parking by placing sensors beneath parking spots that detect when a car is parked above. However, this method is problematic because the sensors are often expensive to install and thus the method does not scale to the millions of miles of streets in the United States.

There are also many spot sharing systems in which groups of drivers notify where and when they vacate sports so that other drivers using the systems will be able to immediately identify an open spot and park there directly. However, a fatal flaw with these systems is that a driver who isn't using the systems can park in a spot vacated by a user and thus render the spot information inconsistent. Furthermore, these community-based systems are often manual and require active user participation to report open spots. In practice, few users are motivated to report open sports to the community.

SUMMARY OF THE INVENTION

The specification overcomes the deficiencies and limitations of the prior art at least in part by providing a system and method for estimating street parking availability for a user. The system comprises a communication module and a parking probability generator. The communication module receives data describing a set of traces for a group of vehicles associated with a group of users. The parking probability generator assigns the set of traces to one or more street segments based at least in part on street segment data describing the one or more street segments. The parking probability generator generates one or more parking probabilities for the one or more street segments based at least in part on one or more user densities in the one or more street segments.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
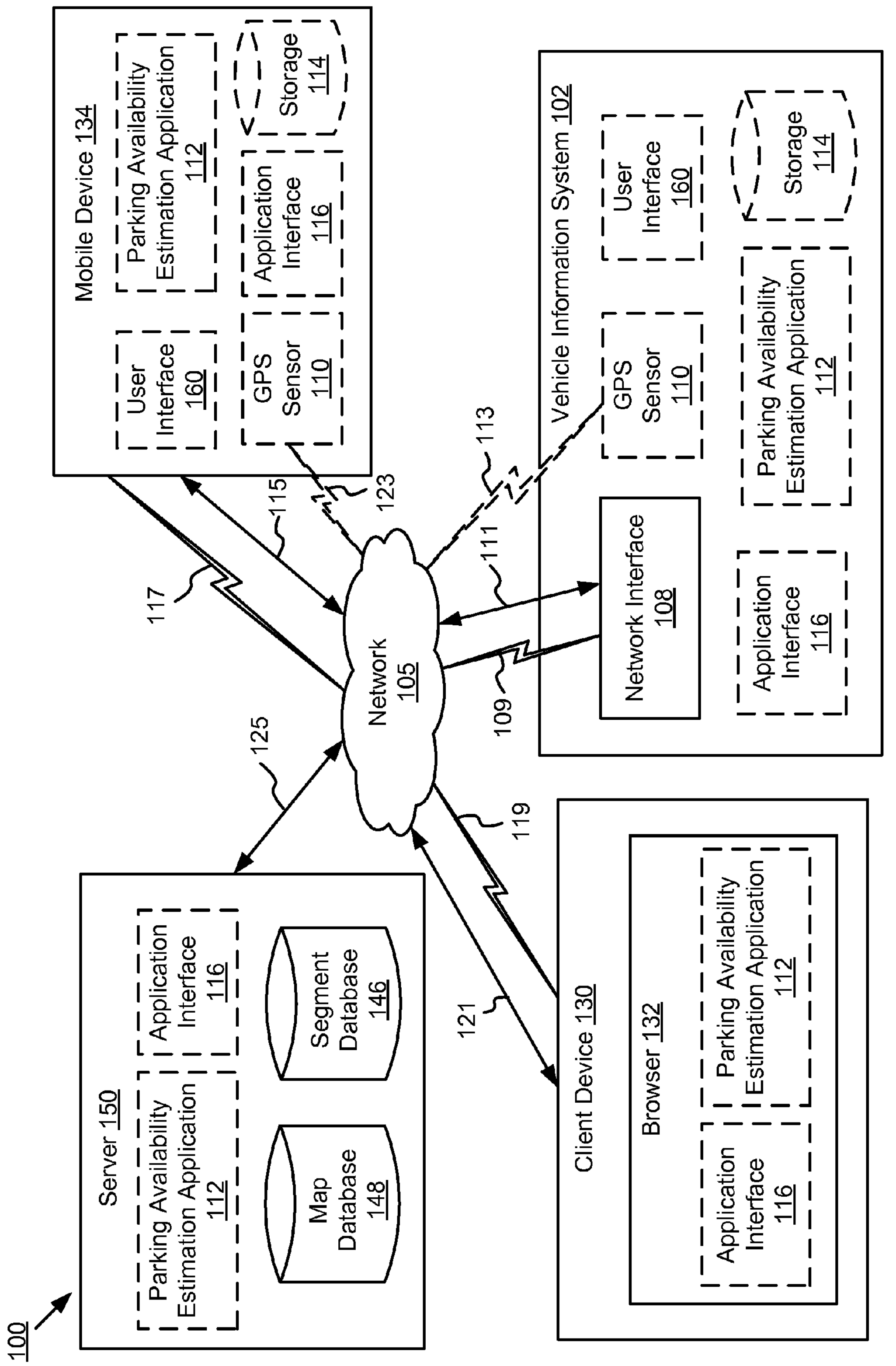
FIG. 1 is a high-level block diagram illustrating a system for estimating street parking availability according to one embodiment.

A system and method for estimating street parking availability is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, compact disc read-only memories (CD-ROMs), magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for estimating street parking availability according to one embodiment. The illustrated system 100 includes a vehicle information system 102, a client device 130, a mobile device 134 and a server 150. These entities of the system 100 are communicatively coupled to each other to facilitate transmitting and receiving of information (e.g., street segment data, map data, etc.) between each other. In the illustrated embodiment, these entities are communicatively coupled via a network 105.

Although FIG. 1 illustrates one vehicle information system 102, one client device 130, one mobile device 134 and one server 150, persons skilled in the art will appreciate that the description applies to any system architecture having any number of vehicle information systems 102, client devices 130, mobile devices 134 and servers 150. Furthermore, although only one network 105 is coupled to the vehicle information system 102, the client device 130, the mobile device 134 and the server 150, in practice any number of networks 105 can be connected to the entities.

In the illustrated embodiment, the client device 130 is communicatively coupled to the network 105 via one or more of signal lines 119 and 121. The mobile device 134 is communicatively coupled to the network 105 via one or more of signal lines 115, 117 and 123. In one embodiment, a global positioning system (GPS) sensor 110 comprised within the mobile device 134 is communicatively coupled to the network 105 via signal line 123. The server 150 is communicatively coupled to the network 105 via signal line 125. The vehicle information system 102 is communicatively coupled to the network 105 via one or more of signal lines 109, 111 and 113. In one embodiment, a network interface 108 comprised within the vehicle information system 102 is communicatively coupled to the network 105 via one or more of signal lines 109 and 111. A GPS sensor 110 comprised within the vehicle information system 102 is communicatively coupled to the network 105 via signal line 113. In one embodiment, each of signal lines 111, 115, 121 and 125 represents one of a wired connection (e.g., a connection via a cable) and a wireless connection (e.g., a wireless local area network (LAN) connection). Each of signal lines 109, 113, 117, 119 and 123 represents a wireless connection (e.g., a wireless LAN connection, a satellite connection, etc.).

The network 105 is a conventional type of network, wired or wireless, and may have any number of configurations such as a star configuration, token ring configuration or other configurations known to those skilled in the art. In one embodiment, the network 105 comprises one or more of a local area network (LAN), a wide area network (WAN) (e.g., the Internet) and/or any other interconnected data path across which multiple devices communicate. In another embodiment, the network 105 is a peer-to-peer network. The network 105 is coupled to or includes portions of a telecommunications network for sending data in a variety of different communication protocols. For example, the network 105 is a 3G network or a 4G network. In yet another embodiment, the network 105 includes Bluetooth® communication networks or a cellular communications network for sending and receiving data such as via short messaging service (SMS), multimedia messaging service (MMS), hypertext transfer protocol (HTTP), direct data connection, wireless application protocol (WAP), email, etc. In yet another embodiment, all or some of the links in the network 105 are encrypted using conventional encryption technologies such as secure sockets layer (SSL), secure HTTP and/or virtual private networks (VPNs).

The vehicle information system 102 is a system for providing parking availability information to a user. For example, the vehicle information system 102 is an on-board system embedded in a vehicle for providing useful information for driving such as map and navigation information, parking information, etc. The vehicle information system 102 includes a network interface 108, a GPS sensor 110, a parking availability estimation application 112, an application interface 116, a storage device 114 and a user interface 160.

The parking availability estimation application 112 and the application interface 116 are depicted using dashed lines to indicate that the parking availability estimation application 112 and the application interface 116 are comprised within any one of the vehicle information system 102, the mobile device 134, the client device 130 and the server 150. Accordingly, in one embodiment, the parking availability estimation application 112 and the application interface 116 are comprised within the mobile device 134. In another embodiment, the parking availability estimation application 112 and the application interface 116 are comprised within the client device 130. In yet another embodiment, the parking availability estimation application 112 and the application interface 116 are comprised within the server 150. The storage 114, the user interface 160 and the GPS sensor 110 are depicted using dashed lines to indicate that in one embodiment the storage 114, the user interface 160 and the GPS sensor 110 are comprised within the mobile device 134.

Although only one network interface 108 is illustrated in the vehicle information system 102, one skilled in the art will recognize that any number of the network interfaces 108 is available in the vehicle information system 102. Although only one GPS sensor 110, one storage 114 and one user interface 160 are illustrated in either of the vehicle information system 102 and the mobile device 134, one skilled in the art will recognize that any number of these components are available in either of the vehicle information system 102 and the mobile device 134. Although only one parking availability estimation application 112 and one application interface 116 are illustrated in any of the vehicle information system 102, the mobile device 134, the client device 130 and the server 150, the one skilled in the art will recognize that any number of these components are available in any of them. One skilled in the art will also appreciate that the vehicle information system 102 may also include any other components not shown in FIG. 1 such as an input device, an audio system.

The network interface 108 is an interface for connecting the vehicle information system 102 to a network. For example, the network interface 108 is a network adapter that connects the vehicle information system 102 to the network 105. The network interface 108 is communicatively coupled to the network 105 via one or more of signal lines 111 and 109. In one embodiment, the network interface 108 receives data from one or more of the client device 130, the mobile device 134 and the server 150 via the network 105. The network interface 108 sends the received data to one or more components of the vehicle information system 102 (e.g., the parking availability estimation application 112, etc.). In another embodiment, the network interface 108 receives data from one or more components of the vehicle information system 102 (e.g., the parking availability estimation application 112, etc.) and sends the data to one or more of the client device 130, the mobile device 134 and the server 150 via the network 105.

In one embodiment, the network interface 108 includes a port for direct physical connection to the network 105 or to another communication channel. For example, the network interface 108 includes a universal serial bus (USB), a category 5 (CAT-5) cable or similar port for wired communication with the network 105. In another embodiment, the network interface 108 includes a wireless transceiver for exchanging data with the network 105, or with another communication channel, using one or more wireless communication methods, such as IEEE 802.11, IEEE 802.16, BLUETOOTH®, near field communication (NFC) or another suitable wireless communication method. In one embodiment, the network interface 108 includes a NFC chip that generates a radio frequency (RF) for short-range communication.

The GPS sensor 110 is a sensor for acquiring and tracking satellite signals and providing GPS trace data. For example, the GPS sensor 110 is a conventional GPS signal receiver that receives satellite signals and reports precise locations. In one embodiment, a location is characterized by an altitude value, a latitude value and a longitude value. The GPS trace data is data describing a trajectory of a vehicle while the vehicle is moving. For example, the GPS trace data describes a trace including a series of continuous vehicle locations.

In one embodiment, the GPS sensor 110 sends the GPS trace data to the parking availability estimation application 112 via the application interface 116. In another embodiment, the GPS sensor 110 broadcasts the GPS trace data for the associated vehicle 102. Other vehicle information systems within a certain range of the GPS sensor 110 will receive the broadcasted GPS trace data. For example, the GPS sensor 110 tracks traces of the vehicle that includes the vehicle information system 102 and broadcasts GPS trace data describing the traces of the vehicle. Other vehicle information systems within a certain miles of the GPS sensor 110 receive the GPS trace data describing the traces of the vehicle 102. Accordingly, in one embodiment, the vehicle information system 102 also receives GPS trace data for other vehicles from their vehicle information systems or mobile devices in them. One skilled in the art will recognize that the GPS sensor 110 may also provide motion information (e.g., speed and/or pace measurement data and distance measurement data, etc.) to a user.

The application interface 116 is code and routines configured to handle communications between the parking availability estimation application 112 and other components comprised within one or more of the vehicle information system 102, the mobile device 134, the server 150 and the client device 130. In one embodiment, the application interface 116 receives GPS trace data from the GPS sensor 110 and/or other GPS sensors in any other vehicles or mobile devices in vehicles. The application interface 116 delivers the GPS trace data to the parking availability estimation application 112. In another embodiment, the application interface 116 receives a user request for street parking availability information from a user via the user interface 160 as described below. The application interface 116 sends the user request for street parking availability information to the parking availability estimation application 112.

The parking availability estimation application 112 is code and routines for estimating street parking availability for a user. In one embodiment, the parking availability estimation application 112 includes code and routines stored in an on-chip storage (not pictured) of the processor (not pictured). In another embodiment, the parking availability estimation application 112 is implemented using hardware such as a field-programmable gate array (FPGA) or an application-specific integrated circuit (ASIC). In yet another embodiment, the parking availability estimation application 112 is implemented using a combination of hardware and software.

In one embodiment, the street parking availability indicates whether there is at least one available parking place in a portion of a street. In one embodiment, the parking availability estimation application 112 receives a request from a user and estimates a parking probability for a portion of a street associated with a current location of the user based on GPS trace data from the GPS sensor 110 and/or other GPS sensors associated with a community of other users. The parking availability estimation application 112 generates a probabilistic map for displaying parking probabilities for portions of streets and sends the probabilistic map to the user interface 160 that presents the probabilistic map the user.

In another embodiment, the parking availability estimation application 112 collects GPS trace data from GPS sensors within a certain range of a user periodically and estimates street parking availability for this range. The parking availability estimation application 112 generates a map displaying the parking probability in this range to the user. The parking availability estimation application 112 is described below in more detail with reference to FIG. 2.

The storage device 114 is a non-transitory memory that stores data. For example, the storage device 114 is a dynamic random access memory (DRAM) device, a static random access memory (SRAM) device, flash memory or some other memory device known in the art. In one embodiment, the storage device 114 also includes a non-volatile memory or similar permanent storage device and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device known in the art. In one embodiment, the storage 114 stores data necessary to implement the functionalities of the parking availability estimation application 112. The storage 114 will be described in further detail below with reference to FIG. 3.

The user interface 160 is a device configured to handle communications between a user and other components comprised within one or more of the vehicle information system 102 and the mobile device 134. In one embodiment, the user interface 160 includes one or more of an in-vehicle touch screen for receiving inputs from a user and a microphone for capturing voice inputs from a user. The user interface 160 sends the inputs (e.g., a request for street parking availability information) from the user to other components of the vehicle information system 102 and/or the mobile device 134 (e.g., the application interface 116). In another embodiment, the user interface 160 is configured to transmit an output from the parking availability estimation application 112 to a user. For example, the user interface 160 displays a map to a user displaying street parking probabilities for an area around the user's current location. One having ordinary skill in the art will recognize that the user interface 160 may include other types of devices for providing the functionality described herein such as a liquid crystal display (LCD).

The client device 130 is any computing device that includes a memory (not pictured) and a processor (not pictured). For example, the client device 130 is a personal computer ("PC"), a cell phone (e.g., a smart phone, a feature phone, etc.), a tablet computer (or tablet PC), a laptop, etc. One having ordinary skill in the art will recognize that other types of client devices 130 are possible. In one embodiment, the system 100 comprises a combination of different types of client devices 130.

In the illustrated embodiment, the client device 130 comprises a browser 132. In one embodiment, the browser 132 is code and routines stored in a memory of the client 130 and executed by a processor of the client device 130. For example, the browser 130 is a browser application such as Mozilla Firefox. In one embodiment, the browser 130 presents a graphic user interface (GUI) to a user on a display device (not pictured) of the client 130 and allows the user to input information via the GUI.

In one embodiment, the browser 130 comprises an application interface 116 and a parking availability estimation application 112. The browser 130 receives information from the parking availability estimation application 112 and presents the information to a user. For example, a user browses trip destinations via the browser 130 and the browser 130 displays the trip destinations to the user. The browser 130 also receives parking availability information for the trip destinations from the parking availability estimation application 112 and displays parking availabilities for the trip destinations to the user.

The mobile device 134 is any mobile computing device that includes a memory (not pictured) and a processor (not pictured). For example, the mobile device 134 is a cell phone (e.g., a smart phone, a feature phone, etc.), a tablet computer (or tablet PC), a laptop, etc. One having ordinary skill in the art will recognize that other types of mobile devices 134 are possible. In one embodiment, the system 100 comprises a combination of different types of mobile devices 134. In one embodiment, the mobile device 134 comprises a GPS sensor 110, a user interface 160, a parking availability estimation application 112, an application interface 116 and a storage device 114.

The server 150 is any computing device having a processor (not pictured) and a computer-readable storage medium storing data for estimating parking availability for users. For example, the server 150 is a dedicated server for estimating street parking availability for users. In the depicted embodiment, the server 150 comprises a segment database 146 and a map database 148. In one embodiment, the server 150 also comprises a parking availability estimation application 112, an application interface 116. These components of the server 150 are communicatively coupled to each other.

The segment database 146 is a database that stores street segment data describing one or more street segments for one or more areas. For example, the street segment data describes a street segment as a length of street between a certain number of intersections such as two intersections. In one embodiment, the segment database 146 provides the street segment data to the parking availability estimation application 112 for assigning GPS trace data to one or more street segments and estimating street parking availabilities for the one or more street segments.

The map database 148 is a database that stores map data describing one or more maps. For example, the map data describes a map for a city. In one embodiment, the map database 148 provides the map data to the parking availability estimation application 112 for generating a probabilistic map that indicates street parking probabilities.

Parking Availability Estimation Application 112

Figure 2:
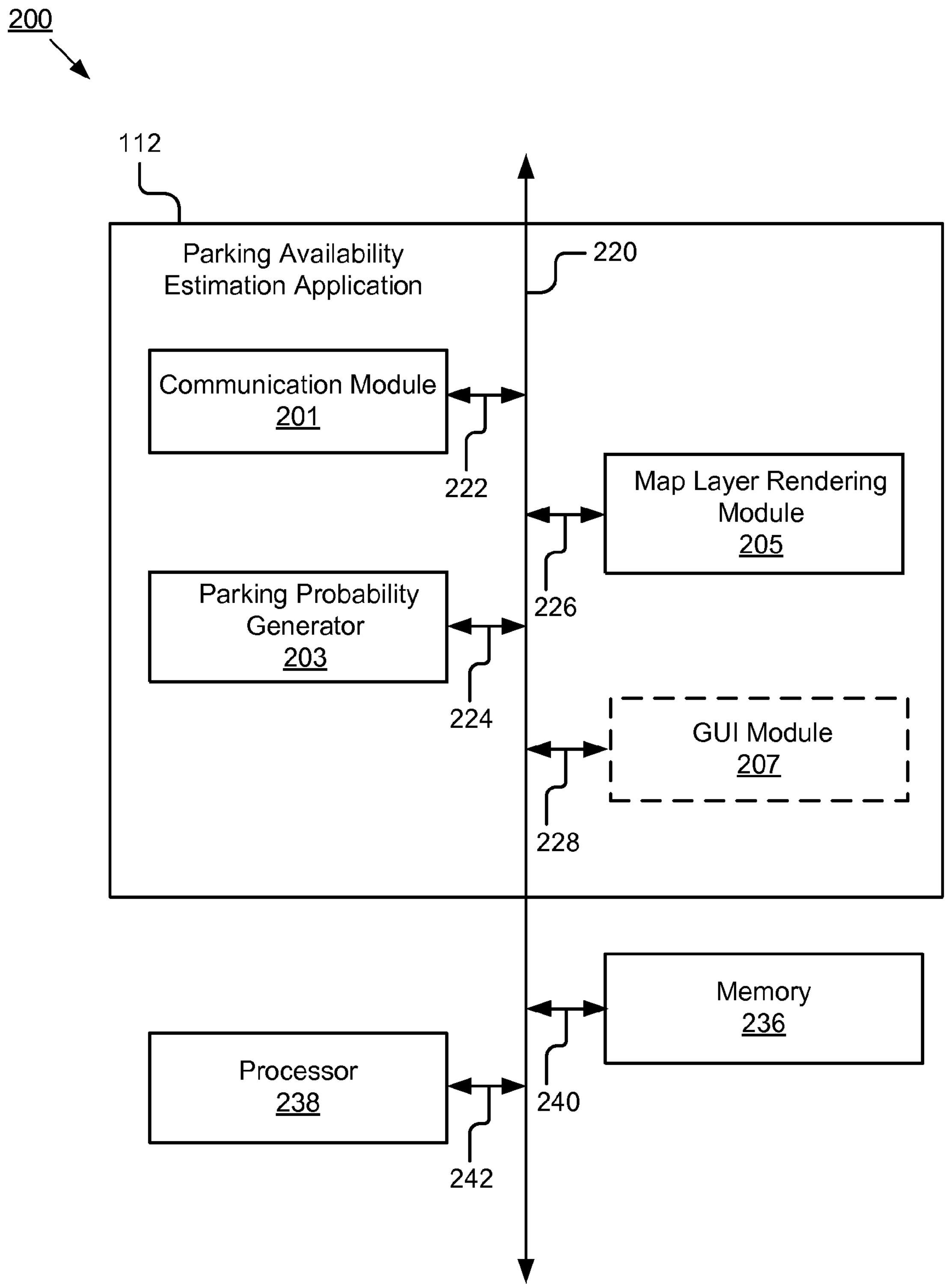
FIG. 2 is a block diagram illustrating a parking availability estimation application in detail according to one embodiment.

Referring now to FIG. 2, depicted is a block diagram of a computing system 200 including a parking availability estimation application 112 in more detail according to one embodiment. In one embodiment, the computing system 200 is the vehicle information system 102. In another embodiment, the computing system 200 is the server 150. In yet another embodiment, the computing system 200 is the mobile device 134. In yet another embodiment, the computing system 200 is the client device 130. The computing system 200 also includes a processor 238 and a memory 236.

In the illustrated embodiment, the parking availability estimation application 112 includes a communication module 201, a parking probability generator 203, a map layer rendering module 205 and a GUI module 207. The GUI module 207 is depicted using a dashed line to indicate that in one embodiment the parking availability estimation application 112 does not comprise the GUI module 207. In one embodiment, these components of the parking availability estimation application 112 are communicatively coupled to each other via a bus 220.

In the illustrated embodiment, the communication module 201 is communicatively coupled to the bus 220 via signal line 222. The parking probability generator 203 is communicatively coupled to the bus 220 via signal line 224. The map layer rendering module 205 is communicatively coupled to the bus 220 via signal line 226. The GUI module 207 is communicatively coupled to the bus 220 via signal line 228. The memory 236 is communicatively coupled to the bus 220 via signal line 240. The processor 238 is communicatively coupled to the bus 220 via signal line 242.

The processor 238 comprises an arithmetic logic unit, a microprocessor, a general purpose controller or some other processor array to perform computations, retrieve data stored on a storage, etc. The processor 238 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 236 stores instructions and/or data that may be executed by the processor 238. The instructions and/or data may comprise code for performing any and/or all of the techniques described herein. The memory 236 may be a dynamic random access memory (DRAM) device, a static random access memory (SRAM) device, flash memory or some other memory device known in the art. In one embodiment, the memory 236 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication module 201 is code and routines for handling communications between components of the parking availability estimation application 112 and other components of the system 100. For example, the communication module 201 receives GPS trace data from GPS sensors 110 associated with a community of users via the application interface 116 and sends the GPS trace data to the parking probability generator 203. In one embodiment, the communication module 201 also stores the GPS trace data in the storage 114. The communication module 201 is communicatively coupled to the bus 220 via signal line 222.

In one embodiment, the communication module 201 receives a user request for parking availability information from a user via the user interface 160 and the application interface 116. The communication module 201 delivers the user request to the parking probability generator 203. In another embodiment, the communication module 201 periodically receives current locations of a user and GPS trace data associated with the current locations of the user. For example, the GPS trace data associated with the current locations of the user describes traces of a community of users driving around the current locations of the user. For example, the application interface 116 retrieves current locations of a user while the user is driving periodically and also receives GPS trace data associated with the current locations of the user. The application interface 116 sends data describing the current locations and the GPS trace data associated with the current locations to the communication module 201.

In one embodiment, the communication module 201 also handles communications among components of the place affinity module 112. For example, the communication module 201 receives one or more parking probabilities from the parking probability generator 203 and sends the one or more parking probabilities to the map layer rendering module 205.

The parking probability generator 203 is code and routines for generating a parking probability for a street segment. For example, the parking probability generator 203 assigns GPS trace data to one or more street segments based on street segment data and estimates a parking probability for a street segment based on a user density in the street segment. The parking probability generator 203 is communicatively coupled to the bus 220 via signal line 224.

In one embodiment, the parking probability generator 203 receives GPS trace data and a user request for parking availability information from the communication module 201. For example, the user request includes a current location of the user. The received GPS trace data includes data describing traces of a community of users driving within a range (e.g., three miles) of the current location of the user during the past two hours. In another embodiment, the parking probability generator 203 receives a current location of the user and GPS trace data associated with the current location of the user from the communication module 201 periodically.

In one embodiment, the parking probability generator 203 retrieves street segment data associated with the GPS trace data from the segment database 146. For example, the retrieved street segment data describes one or more street segments having traces included in the GPS trace data. In another example, the retrieved street segment data describes one or more street segments in one area around the current location of the user (e.g., a district of a city where the user currently is). A street segment is a portion of a street between two intersections. In one embodiment, the parking probability generator 203 stores the street segment data in the storage 114.

In one embodiment, the parking probability generator 203 assigns the GPS trace data to the one or more street segments. For example, the parking probability generator 203 assigns a trace of a user driving through a street segment to this street segment. In one embodiment, if a trace of a user occupies two street segments, the parking probability generator 203 assigns the trace of the user to both of the two street segments. In another embodiment, the parking probability generator 203 assigns a trace occupying two street segments to either one of the two street segments based on a 50% probability.

In one embodiment, the parking probability generator 203 calculates a parking probability for a street segment based at least in part on the assignment of the GPS trace data to the one or more street segments. For example, a parking probability for a street segment indicates a probability that a future user will find parking in this street segment. In one embodiment, the parking probability generator 203 calculates a user density in a street segment. The user density in a street segment indicates a density of users who have traveled through the street segment during a certain period of time. For example, the parking probability generator 203 calculates a ratio of the number of users who have one or more GPS traces or GPS points in a predetermined time period (e.g., in the last 30 minutes) assigned to a street segment to the number of users who have one or more GPS traces or GPS points in the same predetermined time period assigned to street segments in a certain radius (e.g., 2 miles) to the said street segment. The parking probability generator 203 uses the user density (e.g., the ratio described above) in the street segment as the parking probability for the street segment. One skilled in the art will recognize that other calculations of parking probability are possible.

In one embodiment, the parking probability generator 203 generates parking probabilities for street segments in an area around a current location of a user that requests street parking availability information and sends the parking probabilities to the map layer rendering module 205. In one embodiment, the parking probability generator 203 also stores the parking probabilities in the storage 114.

The map layer rendering module 205 is code and routines for generating a probabilistic map for a user. For example, the map layer rendering module 205 generates a probabilistic map layer based on the parking probabilities for street segments. In one embodiment, the map layer rendering module 205 transmits the probabilistic map layer to the application interface 116 via the communication module 201 for generating a map that displays the parking probabilities for street segments to a user. The map layer rendering module 205 is communicatively coupled to the bus 220 via signal line 226.

In one embodiment, the map layer rendering module 205 receives parking probabilities for street segments from the parking probability generator 203. The map layer rendering module 205 retrieves map data from the map database 148. For example, the map data includes a map for the area around the current location of the user that requests parking available information, e.g., a district of a city where the user currently is. The map layer rendering module 205 generates a probabilistic map layer using the parking probabilities for the street segments and the map data. For example, the probabilistic map layer describes parking probabilities for street segments in a map. As another example, the map layer rendering module 205 generates an image of street segments in the area with indicators indicating parking probability for each street segment (e.g. different colors assigned to the street segments based on different parking probabilities for the street segments). An example of the probabilistic map layer is described below with reference to FIG. 6.

In on embodiment, the map layer rendering module 205 transmits the probabilistic map layer to the application interface 116 via the communication module 201. The application interface 116 generates a probabilistic map that displays the parking probabilities for street segments to a user based at least in part on the probabilistic map layer. For example, the probabilistic map is generated by superimposing the probabilistic map layer on the corresponding map. In another embodiment, the map layer rendering module 205 generates a probabilistic map based on the probabilistic map layer. For example, the map layer rendering module 205 generates a probabilistic map by superimposing the probabilistic map layer on a corresponding map. The map layer rendering module 205 sends the probabilistic map to the GUI module 207 for generating a user interface that displays the probabilistic map to the user.

The GUI module 207 is code and routines for providing graphical data for a user. The GUI module 207 is communicatively coupled to the bus 220 via signal line 228. In one embodiment, the GUI module 207 generates graphical data for depicting a user interface to display a probabilistic map to a user. In another embodiment, the GUI module 207 generates graphical data for depicting a user interface by which a user inputs information to the parking availability estimation application 112. The GUI module 207 sends the generated graphical data to the user interface 160, causing the user interface 160 to present the user interface to the user. In one embodiment, the GUI module 207 is not included in the parking availability estimation application 112 and the functionalities of the GUI module 207 described above are performed by the application interface 116.

In one embodiment, the system 100 is particular advantageous since, for example, the parking probability generator 203 automatically retrieves GPS trace data from a community of users, which does not require active user participation. For example, the parking probability generator 203 collects GPS trace data from GPS sensors embedded in mobile phones or in vehicles used by a group of users nearby and the users do not have to manually report open parking spots to the community. This makes the system 100 more reliable than systems based on manual spot reports that require active user participation to be effective. Also the system 100 does not require expensive ground sensors or cameras to detect if there are open parking spots on the street. Furthermore, the parking probability generator 203 estimates probabilities for street parking based on an amount of GPS trace data.

Storage 114

Figure 3:
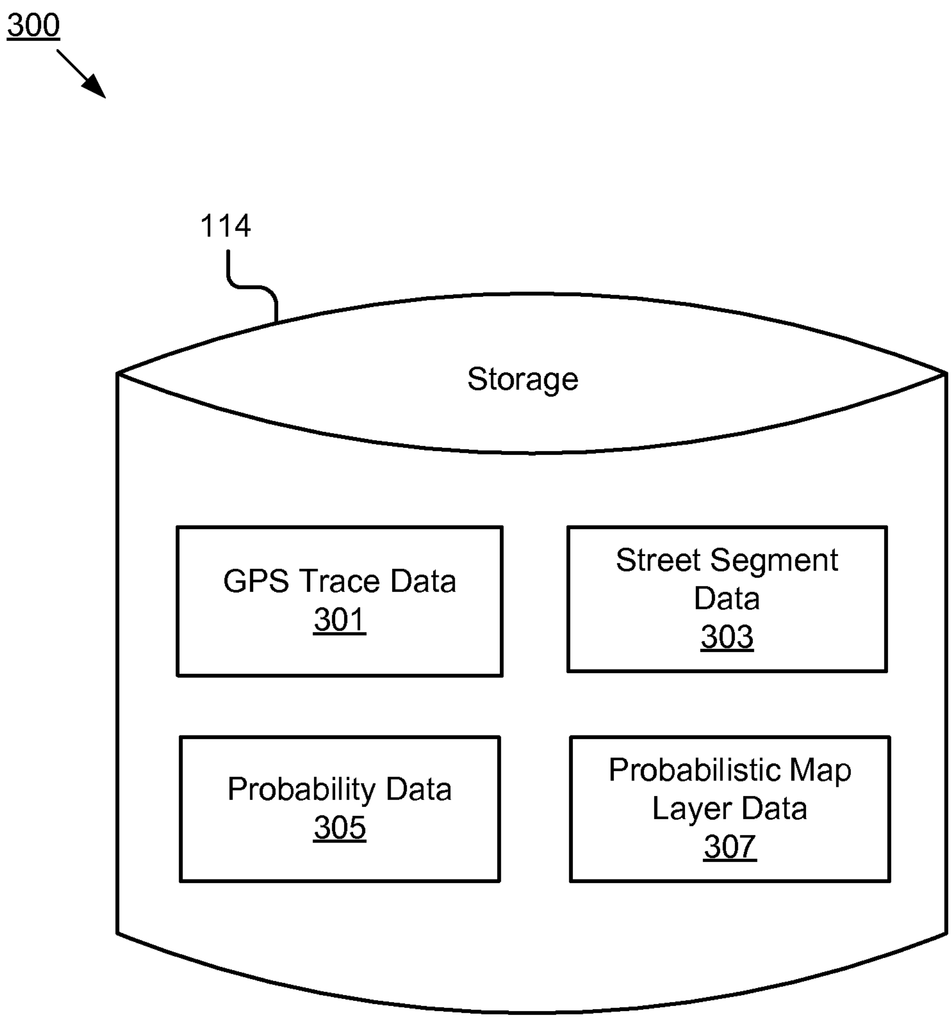
FIG. 3 is a block diagram illustrating a storage device according to one embodiment.

FIG. 3 is a block diagram 300 illustrating storage 114 according to one embodiment. The storage 114 includes GPS trace data 301, street segment data 303, probability data 305 and probabilistic map layer data 307. One skilled in the art will recognize that the storage 114 may include other data for providing functionality described herein.

The GPS trace data 301 includes data describing trajectories of vehicles while the vehicles are traveling. For example, when a vehicle is driving on a street, a GPS sensor located in the vehicle tracks satellite signals periodically and reports a series of continuous locations of the vehicle. The series of continuous locations of the vehicle forms a trace of the vehicle. In one embodiment, the communication module 201 receives GPS trace data from GPS sensors describing traces of vehicles associated with a community of users and stores the GPS trace data 301 in the storage 114.

The street segment data 303 includes data describing street segments. For example, the street segment data 303 describes street segments in one area associated with a current location of a user. In one embodiment, a street segment is defined as a portion of a street between a certain number of intersections. For example, a street segment is a length of road between two intersections. In one embodiment, the parking probability generator 203 retrieves street segment data associated with the GPS trace data from the segment database 146. For example, the retrieved street segment data describes street segments in an area having vehicle traces included in the GPS trace data. The parking probability generator 203 stores the retrieved street segment data in the storage 114.

The probability data 305 includes data describing one or more parking probabilities for one or more street segments. A parking probability for a street segment describes a probability that a future user can successfully find parking in the street segment. In one embodiment, the parking probability generator 203 calculates a parking probability for a street segment based at least in part on the assignment of the GPS trace data to the one or more street segments. The parking probability generator 203 stores the parking probabilities in the storage 114 as probability data 305.

The probabilistic map layer data 307 includes data describing one or more probabilistic map layers that indicate parking probabilities for street segments in one or more areas. For example, a probabilistic map layer includes an image of one or more street segments in an area where the one or more street segments are displayed with different colors according to their parking probabilities. The probabilistic map layer is then used to generate a probabilistic map by combining with a map for the corresponding area.

Methods

Figure 4:
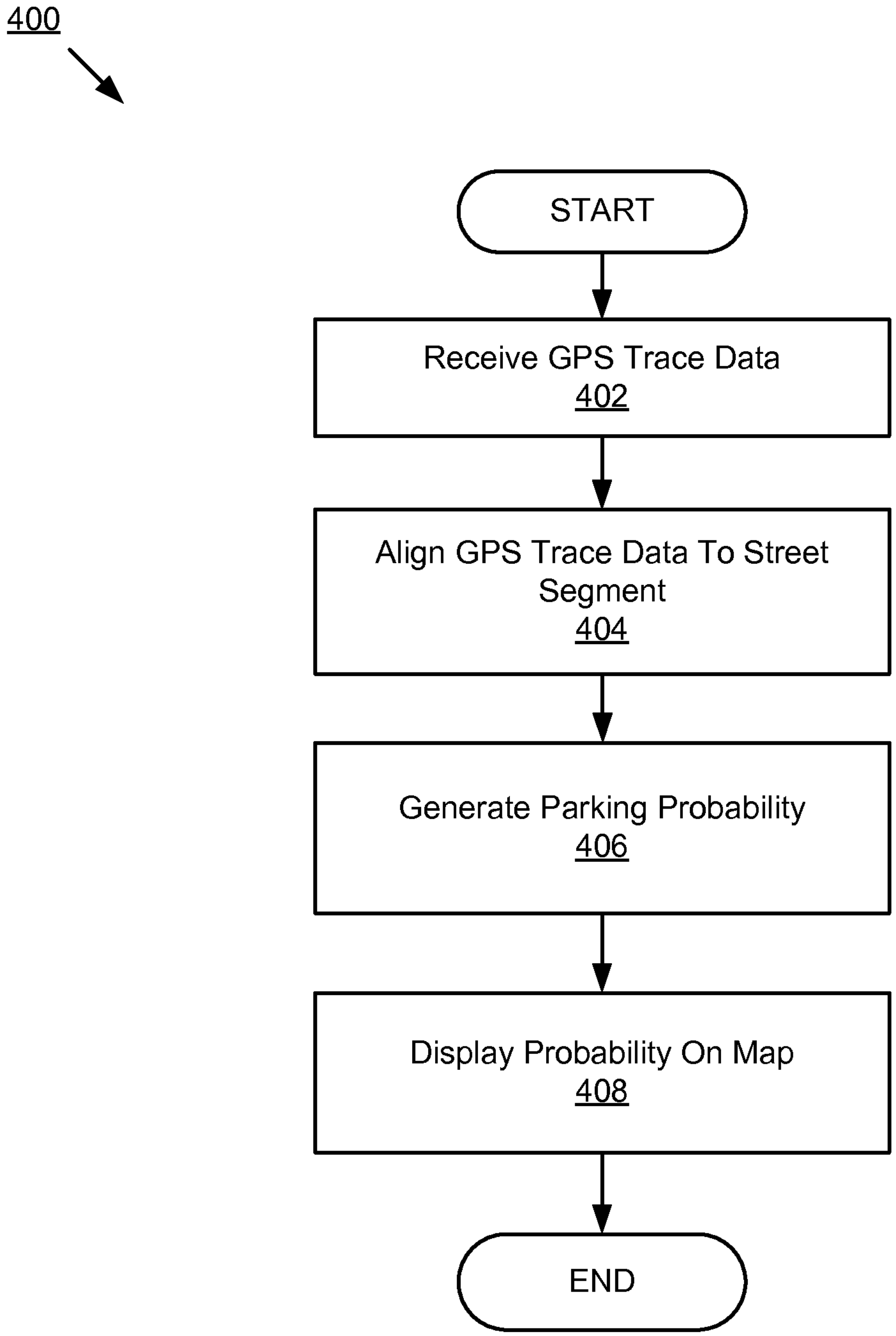
FIG. 4 is a flow diagram illustrating a method for estimating street parking availability according to one embodiment.

FIG. 4 is a flow diagram illustrating a method 400 for estimating street parking availability according to one embodiment. The communication module 201 receives 402 GPS trace data from GPS sensors associated with a group of users. For example, the GPS trace data describes GPS traces for the group of users while they are driving around during the past three hours. The communication module 201 sends the GPS trace data to the parking probability generator 203.

At step 404, the parking probability generator 203 aligns the GPS trace data to one or more street segments based at least in part on street segment data from the segment database 146. For example, the street segment data describes one or more street segments (e.g., portions of streets) in an area associated with the GPS trace data. The parking probability generator 203 assigns GPS traces for the group of users to the one or more street segments. For example, if a GPS trace shows that a user has been driving through a street segment, the parking probability generator 203 assigns the GPS trace to this street segment.

At step 406, the parking probability generator 203 generates parking probabilities for the one or more street segments. For example, the parking probability generator 203 calculates a parking probability for a street segment based on a user density in the street segment (e.g., a ratio of the number of users who have one or more GPS traces or GPS points in a predetermined time period (e.g., in the last 30 minutes) assigned to the street segment to the number of users who have one or more GPS traces or GPS points in the same predetermined time period assigned to street segments in a certain radius (e.g., 2 miles) to the said street segment). The parking probability generator 203 sends the parking probabilities for the one or more street segments to the map layer rendering module 205.

At step 408, the map layer rendering module 205 generates a probabilistic map based on the parking probabilities for the one or more street segments and sends the probabilistic map to the GUI module 207 to display the parking probabilities for the one or more street segments on the map to a user. For example, the probabilistic map includes parking probability indicators for the one or more street segments.

Figure 5:
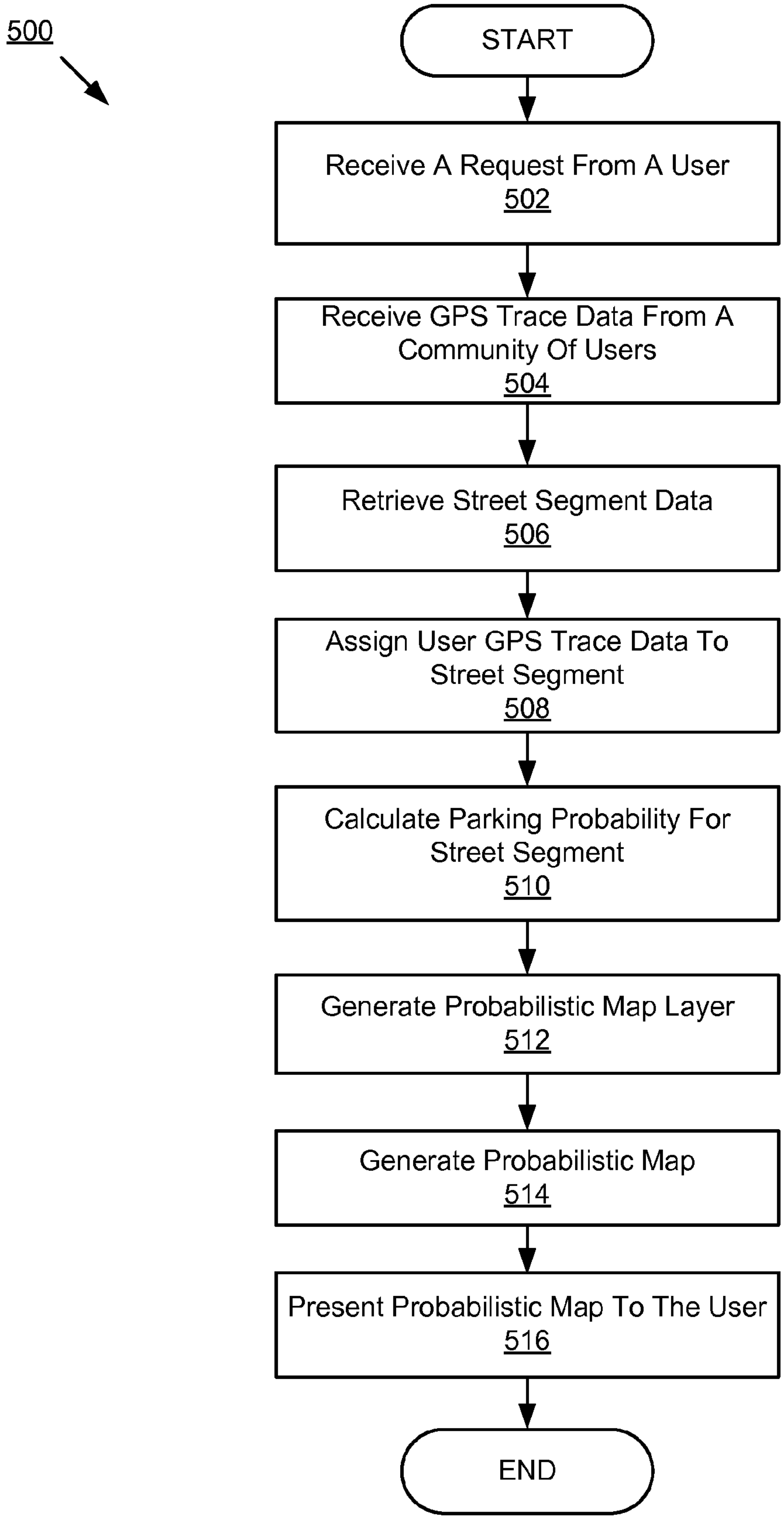
FIG. 5 is a flow diagram illustrating a method for estimating street parking availability according to another embodiment.

FIG. 5 is a flow diagram illustrating a method 500 for estimating street parking availability according to another embodiment. The communication module 201 receives a request for street parking availability information from a user. For example, the request includes a current location of the vehicle associated with the user and indicates that the user is trying to find parking around the current vehicle location. The communication module 201 sends the request to the parking probability generator 203.

At step 504, the communication module 201 receives GPS trace data from a community of users. For example, the communication module 201 receives GPS trace data from GPS sensors in vehicles or embedded in mobile phones associated with a group of users, e.g., a group of users driving in an area around the current location of the requesting user in a past certain period of time (such as in an hour, in two hours, in five hours, etc.). The GPS trace data describes traces of the users while they are driving around. The communication module 201 sends the GPS trace data to the parking probability generator 203.

At step 506, the parking probability generator 203 receives the request and the GPS trace data from the communication module 201 and retrieves street segment data associated with the GPS trace data from the segment database 146. For example, the street segment data describes one or more street segments in one area around the current location of the requesting user (e.g., a district of a city where the requesting user currently is). In one embodiment, a street segment is defined as a portion of a street between two intersections.

At step 508, the parking probability generator 203 assigns GPS trace data from the community of users to the one or more street segments. For example, the parking probability generator 203 assigns a vehicle trace for a user traveling through a street segment to this street segment.

At step 510, the parking probability generator 203 calculates one or more parking probabilities for the one or more street segments based at least in part on the assignment of the GPS trace data to the one or more street segments. For example, the parking probability generator 203 calculates a ratio of the number of users who have one or more GPS traces or GPS points in a predetermined time period (e.g., in the last 30 minutes) assigned to a street segment to the number of users who have one or more GPS traces or GPS points in the same predetermined time period assigned to street segments in a certain radius (e.g., 2 miles) to the said street segment. The parking probability generator 203 uses the ratio calculated above as the parking probability for the street segment. In one embodiment, the parking probability generator 203 calculates parking probabilities for the one or more street segments and sends the parking probabilities for the one or more street segments to the map layer rendering module 205.

At step 512, the map layer rendering module 205 receives parking probabilities for the one or more street segments and generates a probability map layer based on the parking probabilities for the one or more street segments. In one embodiment, the map layer rendering module 205 also retrieves map data including a map for the area from the map database 148. The map layer rendering module 205 generates a probabilistic map layer based on the map data and the parking probabilities for the one or more street segments. For example, the probabilistic map layer includes indicators indicating parking probabilities for the one or more street segments. As another example, the map layer rendering module 205 generates an image of the one or more street segments in the area with indicators indicating parking probability for each street segments (e.g. different colors assigned to the street segments based on different parking probabilities for the street segments).

At step 514, the map layer rendering module 205 generates a probabilistic map using the probabilistic map layer. In one embodiment, the map layer rendering module 205 generates a probabilistic map by superimposing the probabilistic map layer on the map. In another embodiment, the map layer rendering module 205 sends the probabilistic map layer to the application interface 116 that generates a probabilistic map.

At step 516, the map layer rendering module 205 sends the probabilistic map to the GUI module 207 to present the probabilistic map to the requesting user. For example, the GUI module 207 generates graphical data for depicting a user interface to display the probabilistic map to the user.

Examples of Probabilistic Map Layer and Probabilistic Map

Figure 6:
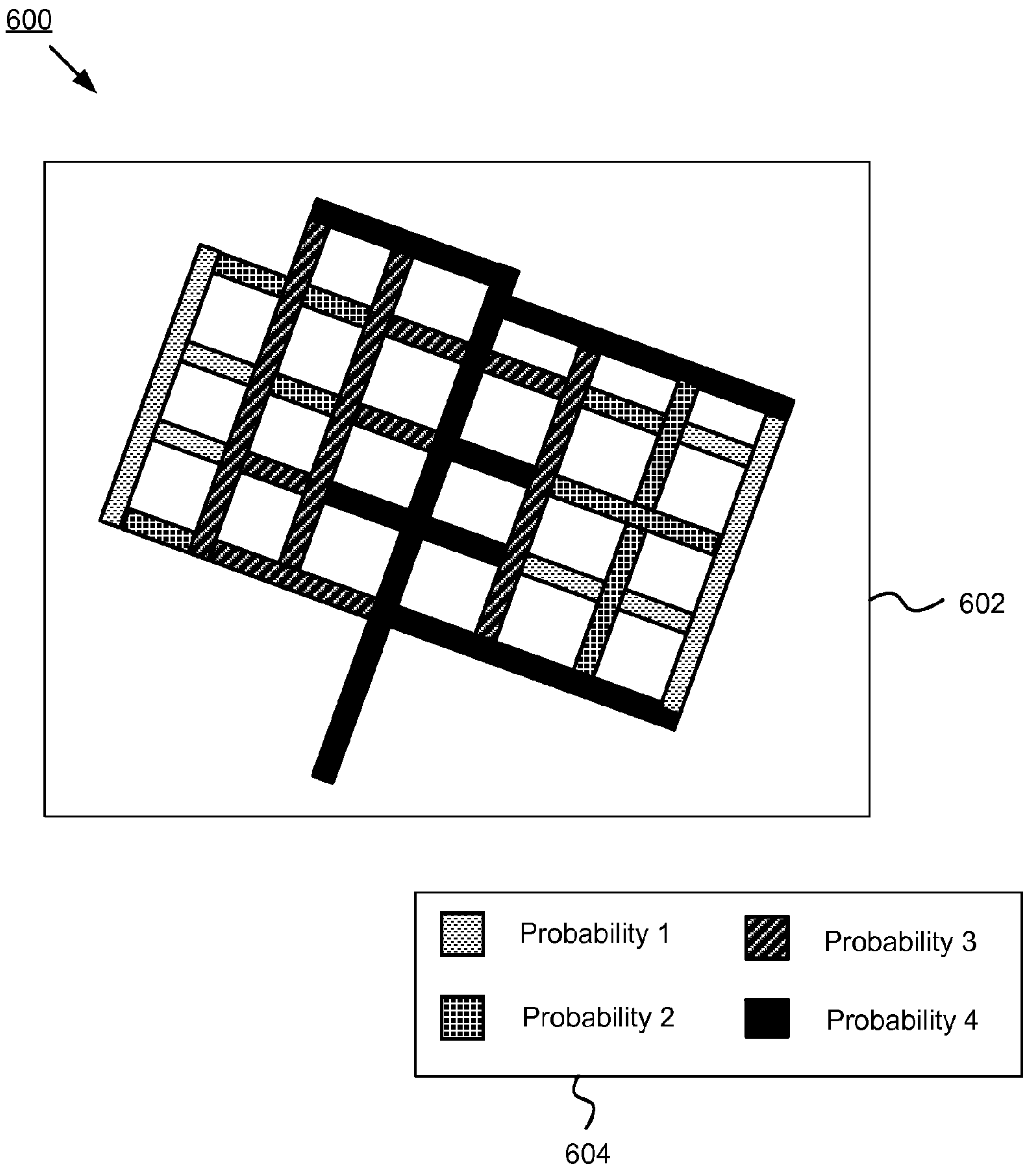
FIG. 6 is a graphical representation illustrating a probabilistic map layer according to one embodiment.

FIG. 6 is a graphical representation 600 illustrating a probabilistic map layer according to one embodiment. Element 602 is a graphic representation of a probabilistic map layer 602. The probabilistic map layer 602 includes graphic representations of street segments as they are on a map and the street segments are represented using different textures. Element 602 is a legend 602 describing that the different textures indicate different parking probabilities.

Figure 7:
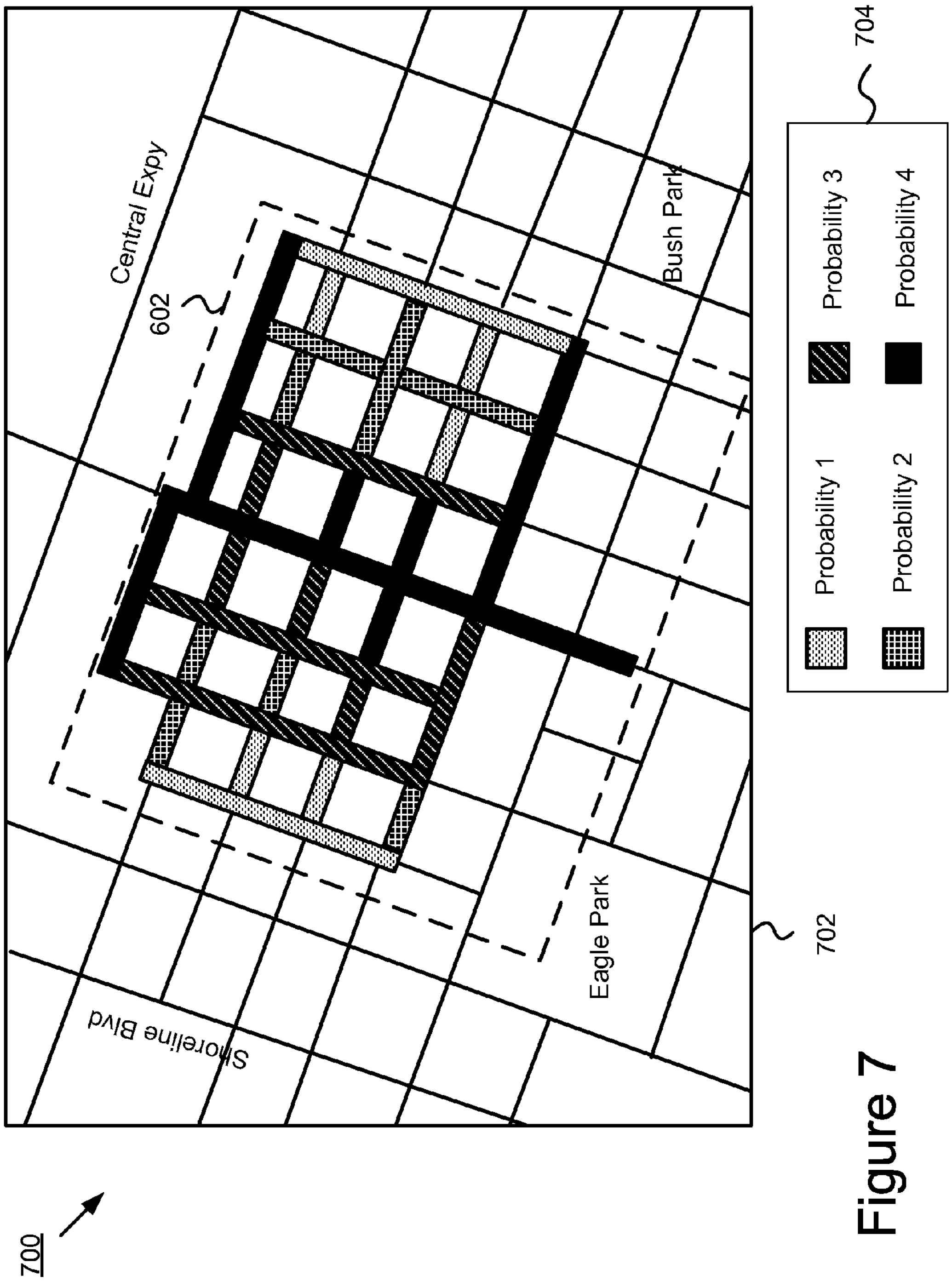
FIG. 7 is a graphical representation illustrating a probabilistic map according to one embodiment.

FIG. 7 is a graphical representation 700 illustrating a probabilistic map according to one embodiment. Element 702 is a graphic representation of a probabilistic map 702. Element 602 a graphic representation of a probabilistic map layer 602 as described above with reference to FIG. 6. In the illustrated embodiment, the probabilistic map 702 is generated by superimposing the probabilistic map layer 602 on a map. Element 704 is a legend 704 describing that different textures for the street segments in the probabilistic map layer 602 indicate different parking probabilities for the street segments.

In the forgoing description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, compact disc read-only memories (CD-ROMs), magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Furthermore, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

Finally, the foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification.

What is claimed is:

1. A computer-implemented method, comprising:

receiving data describing a set of traces for a group of vehicles associated with a group of users;

assigning the set of traces to one or more street segments based at least in part on street segment data describing the one or more street segments, the one or more street segments each including a length of street between a certain number of intersections;

generating one or more parking probabilities for the one or more street segments based at least in part on one or more user densities in the one or more street segments; and generating a probabilistic map layer based at least in part on the one or more parking probabilities, the probabilistic map layer including an image of the one or more street segments displaying one or more indicators in the one or more street segments that indicate the one or more parking probabilities for the one or more street segments.

2. The method of claim 1, wherein each of the one or more parking probabilities applies to an entire distinct street segment spanning between two or more intersections, and describes a probability for successfully finding parking in that street segment.

3. The method of claim 1, wherein the parking probability for one street segment is a probability that a future user will find parking in the street segment.

4. The method of claim 1, wherein the user density in one street segment describes a density of users that have driven through the street segment in a certain period of time.

5. The method of claim 1, wherein the user density in one street segment is the ratio of the number of users that have one or more traces assigned to the street segment to the number of users that have one or more traces assigned to a certain range around the street segment.

6. The method of claim 1, further comprising:

generating a probabilistic map based at least in part on the probabilistic map layer; and displaying the probabilistic map to a user.

7. A system, comprising:

a communication module for receiving data describing a set of traces for a group of vehicles associated with a group of users;

a parking probability generator communicatively coupled to the communication module, the parking probability generator assigning the set of traces to one or more street segments based at least in part on street segment data describing the one or more street segments, the one or more street segments each including a length of street between a certain number of intersections, the parking probability generator generating one or more parking probabilities for the one or more street segments based at least in part on one or more user densities in the one or more street segments; and a map layer rendering module communicatively coupled to the parking probability generator, the map layer rendering module generating a probabilistic map layer based at least in part on the one or more parking probabilities, the probabilistic map layer including an image of the one or more street segments displaying one or more indicators in the one or more street segments that indicate the one or more parking probabilities for the one or more street segments.

8. The system of claim 7, wherein each of the one or more parking probabilities applies to an entire distinct street segment spanning between two or more intersections, and describes a probability for successfully finding parking in that street segment.

9. The system of claim 7, wherein the parking probability for one street segment is a probability that a future user will find parking in the street segment.

10. The system of claim 7, wherein the user density in one street segment describes a density of users that have driven through the street segment in a certain period of time.

11. The system of claim 7, wherein the user density in one street segment is the ratio of the number of users that have one or more traces assigned to the street segment to the number of users that have one or more traces assigned to a certain range around the street segment.

12. The system of claim 7, further comprising an application interface communicatively coupled to the map layer rendering module, the application interface generating a probabilistic map based at least in part on the probabilistic map layer and displaying the probabilistic map to a user.

13. A computer program product comprising a non-transitory computer readable medium encoding instructions that, in response to execution by a computing device, cause the computing device to perform operations comprising:

receiving data describing a set of traces for a group of vehicles associated with a group of users;

assigning the set of traces to one or more street segments based at least in part on street segment data describing the one or more street segments, the one or more street segments each including a length of street between a certain number of intersections;

generating one or more parking probabilities for the one or more street segments based at least in part on one or more user densities in the one or more street segments; and generating a probabilistic map layer based at least in part on the one or more parking probabilities, the probabilistic map layer including an image of the one or more street segments displaying one or more indicators in the one or more street segments that indicate the one or more parking probabilities for the one or more street segments.

14. The computer program product of claim 13, wherein each of the one or more parking probabilities applies to an entire distinct street segment spanning between two or more intersections, and describes a probability for successfully finding parking in that street segment.

15. The computer program product of claim 13, wherein the parking probability for one street segment is a probability that a future user will find parking in the street segment.

16. The computer program product of claim 13, wherein the user density in one street segment describes a density of users that have driven through the street segment in a certain period of time.

17. The computer program product of claim 13, wherein the user density in one street segment is the ratio of the number of users that have one or more traces assigned to the street segment to the number of users that have one or more traces assigned to a certain range around the street segment.

18. The computer program product of claim 13, wherein instructions encoded in the computer readable medium when executed cause the computing device to perform operations further comprising:

generating a probabilistic map based at least in part on the probabilistic map layer; and displaying the probabilistic map to a user.

19. A computer-implemented method, comprising:

receiving data describing a set of traces for a group of vehicles associated with a group of users;

assigning the set of traces to one or more street segments based at least in part on street segment data describing the one or more street segments, the one or more street segments each including a length of street between a certain number of intersections;

generating one or more estimates measuring successful street parking in the one or more street segments based at least in part on one or more user densities in the one or more street segments; and generating a probabilistic map layer based at least in part on the one or more parking probabilities, the probabilistic map layer including an image of the one or more street segments displaying one or more indicators for the one or more street segments that indicate the one or more estimates measuring successful street parking in the one or more street segments.

* * * * *